United States Patent
Hallett et al.

(10) Patent No.: US 6,675,100 B1
(45) Date of Patent: *Jan. 6, 2004

(54) HOT PLATE PRECIPITATION MEASURING SYSTEM

(75) Inventors: John Hallett, Reno, NV (US); Roy Martin Rasmussen, Boulder, CO (US)

(73) Assignees: University Corporation for Atmospheric Research, Boulder, CO (US); The Board of Regents of the University & College System of Nevada, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/368,509

(22) Filed: Feb. 18, 2003

Related U.S. Application Data

(63) Continuation of application No. 09/395,088, filed on Sep. 13, 1999, now Pat. No. 6,546,353.

(51) Int. Cl.[7] .............................. G01W 1/00; G01W 1/14
(52) U.S. Cl. .................... 702/3; 702/130; 73/170.16; 73/170.17; 73/170.21; 356/336
(58) Field of Search .................. 702/130, 3; 73/170.16, 73/170.17, 170.18, 170.19, 170.21; 356/336, 338, 342

(56) References Cited

U.S. PATENT DOCUMENTS

| | | |
|---|---|---|
| 2,740,293 A | 4/1956 | Brady |
| 3,141,330 A | 7/1964 | Murray et al. |
| 3,428,890 A | 2/1969 | Peck et al. |
| 3,472,088 A | 10/1969 | Ojard |
| 3,575,641 A | 4/1971 | Long |
| 4,292,843 A | 10/1981 | Luchessa et al. |
| 4,305,280 A | 12/1981 | Vonnegut et al. |
| 4,893,506 A | 1/1990 | Shyu et al. |
| 5,016,196 A | 5/1991 | Nelson et al. |
| 5,028,929 A | 7/1991 | Sand et al. |
| 5,379,215 A | 1/1995 | Kruhoeffer et al. |
| 5,406,481 A | 4/1995 | Shinozawa et al. |
| 5,440,483 A | 8/1995 | Badoche-Jacquet et al. |
| 5,517,193 A | 5/1996 | Allison et al. |
| 5,528,224 A | 6/1996 | Wang |
| 5,528,493 A | 6/1996 | Potter |
| 5,583,972 A | 12/1996 | Miller |
| 5,744,711 A | 4/1998 | Rasmussen et al. |
| 5,850,619 A | 12/1998 | Rasmussen et al. |
| 5,880,836 A | 3/1999 | Lonnqvist |
| 6,044,699 A | 4/2000 | Greenblatt et al. |
| 6,546,353 B1 | 4/2003 | Hallett et al. |

FOREIGN PATENT DOCUMENTS

| | | |
|---|---|---|
| CH | 627856 | 1/1982 |
| EP | 0 510 846 A2 | 10/1992 |
| EP | 0 622 639 A2 | 11/1994 |
| JP | 01141391 | 6/1989 |
| JP | 05323047 | 7/1993 |
| JP | 59210390 | 11/1994 |
| JP | 09171084 | 6/1997 |
| JP | 11052065 | 2/1999 |
| WO | WO 87/05116 | 8/1987 |

Primary Examiner—Kamini Shah
(74) Attorney, Agent, or Firm—Duft Setter Ollila & Bornsen

(57) ABSTRACT

A precipitation measuring system comprising a top thermal plate positioned to maximize exposure to falling precipitation and includes at least one ridge circumscribing the top surface for capturing precipitation. A second thermal plate is positioned under the top thermal plate to protect it from falling precipitation while still exposing it to the same atmospheric temperature and wind conditions. At least one solar radiation sensor is connected to the precipitation measuring system to measure solar radiation contacting at least one of the top and bottom thermal plates. During a precipitation event, the top and bottom thermal plates are maintained at a constant temperature and a power consumption curve for each thermal plate is quantified. The precipitation rate is measured by the difference in the power consumption curve for the top thermal plate and the power consumption curve for the bottom thermal plate.

26 Claims, 8 Drawing Sheets

HOT PLATE PRECIPITATION MEASURING SYSTEM

RELATED INFORMATION

This patent application is a continuation of patent application Ser. No. 09/395,088 filed Sep. 13, 1999 now U.S. Pat. No. 6,546,353, which is hereby incorporated by reference into this patent application.

GOVERNMENT FUNDED INVENTION

The invention was made with Government support under Agreement No. DTFA01-98-C-00031 awarded by the Federal Aviation Administration. The Government has certain rights in this invention.

FIELD OF THE INVENTION

The invention relates to meteorological instrumentation, and particularly to an improved method and apparatus for real-time detection and quantification of precipitation reaching the earth's surface at a given point.

PROBLEM

Rain gauges and snow gauges are common names for devices designed to quantify precipitation and the winter equivalent of precipitation that reaches the earth's surface. Various types of rain and snow gauges have been developed to detect and quantify precipitation and its winter equivalent. One example of a precipitation gauge uses a container to collect free falling precipitation for later measurement. In the case of winter precipitation or snow, the snow is collected in a container housing chemicals to melt the snow into a liquid form. In another example of a precipitation gauge, the rain or snow is collected in a container and upon accumulation of a measurable amount, the gauge detects or "tips" under the weight of the melted snow pouring the liquid into a collection container. The weight of the collected sample is converted into a corresponding depth measurement to estimate the total accumulation of precipitation and the precipitation rate over time. In both examples, the precipitation ideally free-falls into the accumulation container at the same rate and in the same quantity as the precipitation would fall in the immediate vicinity of the gauge.

One problem with these gauges, however, is the overall accuracy of the gauge is limited to mechanical resolutions of accumulation. Therefore, a light snowfall or rainfall event can go completely undetected due to evaporation from the gauge before detection or a measurable amount of accumulation occurs. Another related problem with these gauges is the inability to report real-time accumulation. Even during heavy precipitation events, there is a time delay ranging from a few minutes to thirty minutes or more before a measurable sample amount is collected.

To correct these problems, more recent gauges such as the gauge described in U.S. Pat. No. 5,744,711 have been developed to provide real-time detection and measurement of precipitation events. These gauges use a pair of thermal plates housed in a cylindrical tube. A first thermal plate or sensor plate is horizontally positioned in the tube to collect precipitation. A second thermal plate or reference plate is vertically positioned under the first thermal plate to protect it from contact with the precipitation while still allowing exposure to the same atmospheric temperature conditions. The pair of thermal plates are individually heated and maintained at a substantially constant temperature during a precipitation event. The difference in current used to maintain the individual thermal plates at the substantially constant temperature is quantified and converted into the precipitation rate. A fan positioned in the tube under the thermal plates draws air through the tube to prevent a convecting heat plume from developing at the top of the tube.

A first problem with this gauge is inaccuracies in data collection caused by solar radiation. During periods when precipitation is not falling, solar radiation contacting the top thermal plate heats the plate causing the power required to maintain the substantially constant temperature to fluctuate. These power fluctuations cause noise and other inaccuracies in measuring precipitation events.

A second problem with this gauge is capturing the precipitation and preventing it from sliding off the top thermal plate before the melting and evaporation can occur that causes the power fluctuation. This is especially critical during blowing precipitation events where the wind carries the precipitation into the system at an angle.

A third problem with the gauge is that it is large and bulky requiring dedicated mechanical components such as a fan, fan motor and tube, which increase cost and require frequent maintenance. Furthermore, during precipitation measuring in remote locations, it is desired to carry as little equipment as possible. This is especially true in locations accessible only by helicopter or all terrain vehicles.

A fourth problem with the gauge is the inability to differentiate between a blowing precipitation event and a natural precipitation event. A blowing precipitation event is where the precipitation, such as snow, has already fallen to the earth's surface, but due to windy or gusty atmospheric conditions is being blown about to different locations. A natural precipitation event is where the -precipitation is falling to the earth's surface for the first time. A natural precipitation event may occur in substantially still or windy atmospheric conditions.

For these reasons, it is desirable to have a precipitation measuring system that accounts for solar radiation, differentiates between different precipitation events, is compact, and prevents precipitation from leaving the system before melting and evaporation can occur.

SOLUTION

The precipitation measuring system of the present invention overcomes the problems outlined above and advances the art by providing a hot plate precipitation measuring system that accounts for solar radiation, differentiates between blowing and natural precipitation events, and prevents precipitation from leaving the system before melting and evaporation can occur. In the context of this application, precipitation includes year round precipitation during both winter and summer months. Some examples of precipitation include without limitation, snow, rain, mist, drizzle, fog, freezing rain, freezing drizzle, sleet, and hail. The precipitation can be blowing precipitation, natural precipitation, or a combination of a blowing and natural precipitation.

The precipitation measuring system comprises a top thermal plate generally positioned horizontal to maximize exposure to falling precipitation and includes at least one ridge circumscribing the top surface for capturing precipitation. A bottom thermal plate is positioned directly under the top thermal plate to protect the bottom thermal plate from falling precipitation while still exposing it to the same atmospheric temperature and wind conditions as the top thermal plate. At least one solar radiation sensor is connected proximate the precipitation measuring system to measure both direct and scattered solar radiation. During a precipitation event, the top and bottom thermal plates are maintained at a constant temperature and a power consumption curve for each thermal plate is quantified. The power consumption curves are corrected for heating caused by solar radiation and the precipitation rate is measured by the difference in the corrected power consumption curves for the top and bottom thermal plates.

In another embodiment of the precipitation measuring system the at least one solar radiation sensor is replaced by a precipitation on/off sensor that automatically starts the precipitation measuring system at the beginning of a precipitation event and automatically shuts down the system at the end of the event. In yet another embodiment, at least one other pair of thermal plates is used to determine the occurrence of a blowing precipitation event and a natural precipitation event by measuring the difference in the amount of precipitation contacting the pairs of thermal plates.

One or more of the following features can also be incorporated into the present precipitation measuring system: 1) a stand, balloon or other air-borne device to elevate the precipitation measuring system above the earth's surface; 2) a de-icing apparatus to prevent ice from forming on the stand and other components; and 3) real-time adjustment of the substantially constant temperature of the thermal plates to accommodate varying precipitation rates.

A first advantage of the present invention is that the operating temperature of the present precipitation measuring system is lower than prior art systems because precipitation is captured and trapped by the top thermal plate. This results in cost savings and reduces the hazards of working with a heated device. A second advantage of the present invention is that it is compact and does not include bulky mechanical components that wear out or are subject to frequent maintenance. A third advantage of the present invention is that de-icing the stand and other components permits increased accuracy in precipitation measurement. A fourth advantage of the present invention is that the real-time temperature adjustment of the thermal plates results in power savings, increased accuracy in precipitation measurement, and prevents overloading during heavy precipitation events.

DETAILED DESCRIPTION

Figure 1:
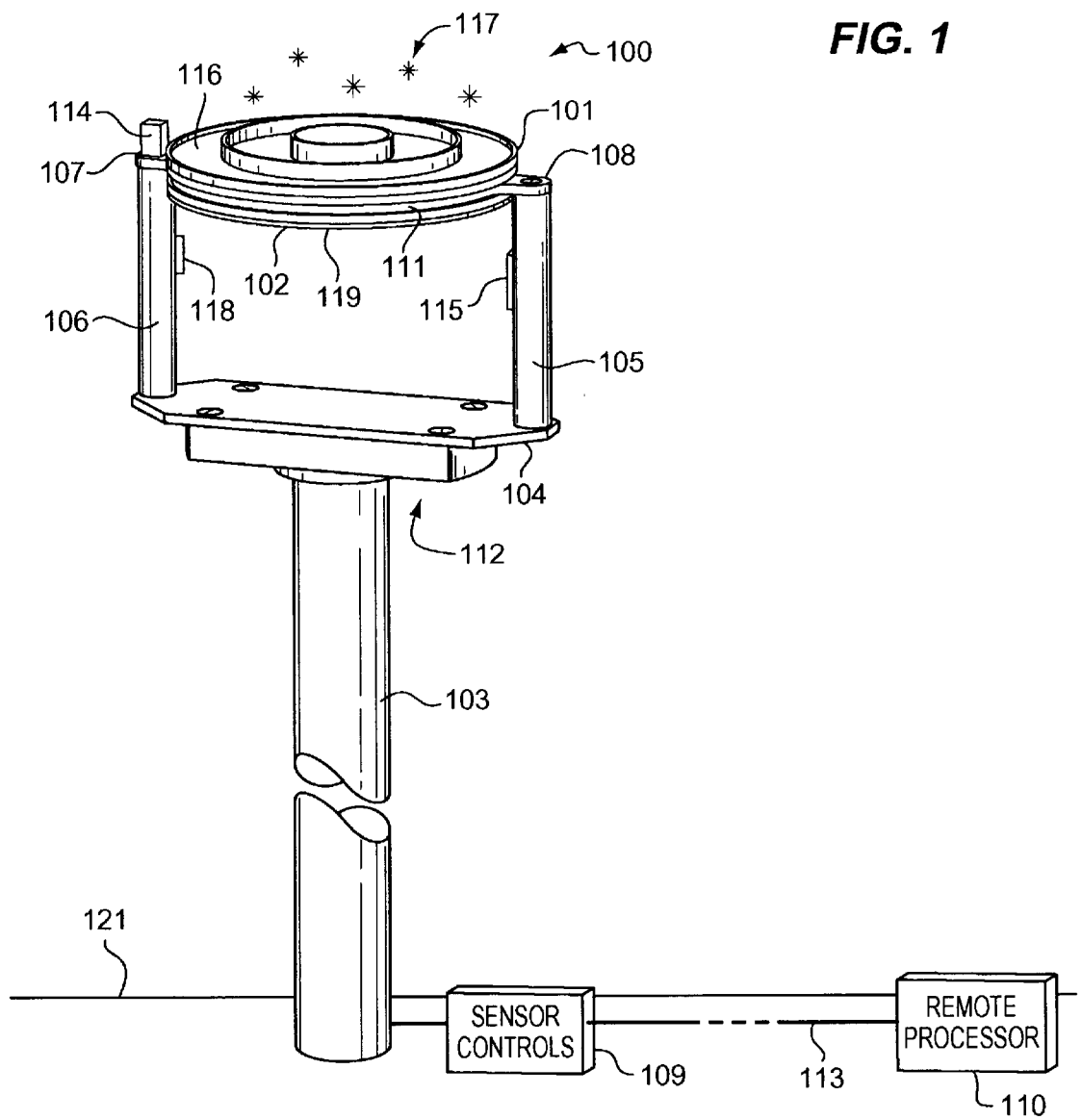
FIG. 1, illustrates a precipitation measuring system of the present invention.

Precipitation Measuring System FIGS. 1–4:

FIG. 1 illustrates a perspective view of a hot plate precipitation measuring system 100. The major components of precipitation measuring system 100 are sensor electronics and stand 112. Sensor electronics include top thermal plate 101, bottom thermal plate 102, sensor controls 109, solar radiation sensors 114 and 118, atmospheric temperature sensor 115 and remote processor 110. Thermal plates 101 and 102 connect to mounting posts 105 and 106 by brackets 107 and 108. Top thermal plate 101 is generally positioned horizontally relative to the earth's surface 121 to permit maximum exposure to falling precipitation. In some cases however, such as measurement on an inclined surface, top thermal plate 101 could be positioned other than horizontal to maximize exposure to falling precipitation 117. Bottom thermal plate 102 is positioned in a facial relationship directly under top thermal plate 101 to subject bottom thermal plate 102 to the same ambient temperature and/or airflow while facilitating a maximum protection from falling precipitation. Insulation 111 is positioned between top thermal plate 101 and bottom thermal plate 102 to prevent heat generated by one of thermal plates 101 and 102 from affecting the other one of thermal plates 101 and 102.

Solar radiation sensor 114 is connected on the top of mounting post 106 by bracket 107 to detect solar radiation contacting top thermal plate 101. Solar radiation sensor 118 is connected to mounting post 106 at a lower elevation than bottom thermal plate 102 to detect solar radiation contacting exposed surface 119 of bottom thermal plate 102. Those skilled in the art will readily understand that solar radiation contacting bottom thermal plate 102 is generally caused by reflection off of ground 121, and thus, solar radiation sensor 118 may not be needed in some applications where significant reflection does not occur. In alternative embodiments, solar radiation sensor 114 could be located at other locations provided it is proximate top surface 116 of top thermal plate 101 to facilitate measuring solar radiation contacting top surface 116. Similarly, solar radiation sensor 118 could be located at other locations provided it is proximate the exposed surface 119 of bottom thermal plate 102. Atmospheric temperature sensor 115 is connected to mounting post 105 proximate bottom thermal plate 102. Alternatively, atmospheric temperature sensor 115 could be connected at other locations on precipitation measuring system 100 so long as it is proximate enough to precipitation measuring system 100 to facilitate an accurate atmospheric temperature measurement and provided that it does not obstruct precipitation 117 from contacting top thermal plate 101.

Sensor controls 109 include processing electronics that control the temperature of thermal plates 101 and 102. Sensor controls 109 are connected to bottom thermal plate 102, top thermal plate 101, solar radiation sensors 114 and 118, and atmospheric temperature sensor 115. Sensor controls are also connected to remote processor 110 by communications link 113. Alternative sensor control locations include without limitation, positioned internal to post 103, operatively connected to precipitation measuring system 100 from a remote location, or any location within or proximate to precipitation measuring system 100, provided the position does not obstruct precipitation 117 from contacting top thermal plate 101. Those skilled in the art will readily understand that sensor controls 109 are calibrated according to the type of precipitation being measured. For example, the calibration of sensor controls 109 could differ when precipitation 117 is summer precipitation and when precipitation 117 is winter precipitation.

Remote processor 110 collects data from top thermal plate 101 and bottom thermal plate 102 for real-time or subsequent precipitation rate calculation and processing. Remote processor 110 could also be connected to a plurality of precipitation measuring systems 100. In this case remote processor 110 collects data from the multiple precipitation measuring systems for real-time or subsequent precipitation rate calculation and processing.

Stand 112 permits elevating top thermal plate 101 and bottom thermal plate 102 above the earth's surface 121. Stand 112 includes a post 103, a base plate 104, and mounting posts 105 and 106. Mounting posts 105 and 106 are connected perpendicular to base plate 104. Base plate 104 is connected to the top of post 103, which is mounted on the earth's surface 121. Stand 112 could be various heights above the earth's surface as a matter of design choice to accommodate different applications of precipitation measuring system 100. For example in mountainous regions or areas with heavy annual snowfall, post 103 would be taller to prevent precipitation measuring system 100 from being buried in deep snow. Similarly, in areas containing dense vegetation and/or foliage, post 103 could be taller so that thermal plates 101 and 102 extend above the vegetation and/or foliage to facilitate capturing a maximum amount of precipitation 117. Likewise, in barren locations, post 103 could be shorter to accommodate the lack of vegetation or other obstructions. In another example, post 103 could be removed from precipitation measuring system 100 altogether to improve mobility of precipitation measuring system 100.

A preferred feature of the present precipitation measuring system is that wind speed can be calculated using the bottom thermal plate, which is not exposed to precipitation but is exposed to the same amount of wind. The wind speed is calculated by the amount of power consumption in the bottom thermal plate 102 relative to the atmospheric temperature at precipitation measuring system 100.

In alternative embodiments designed for severe winter weather conditions, precipitation measuring system 100 also includes a de-icing apparatus to de-ice stand 112 and solar radiation sensors 114 and 118. Specifically, during severe winter weather conditions, ice forms on mounting posts 105 and 106, brackets 107 and 108, base plate 104 and solar radiation sensors 114 and 118. The ice affects the power required to maintain thermal plates 101 and 102 at a constant temperature, affects solar radiation measurement, and as will be apparent from the following discussion affects the accuracy of precipitation measuring system 100. The de-icing apparatus could be any apparatus that prevents ice from forming on mounting posts 105 and 106, brackets 107 and 108, base plate 104, and solar radiation sensors 114 and 118. Examples of the de-icing apparatus include without limitation, the application of chemical anti-freezes or an electrode or other heating element that slightly heats mounting posts 105 and 106, brackets 107 and 108, base plate 104, and solar radiation sensors 114 and 118.

Figure 2:
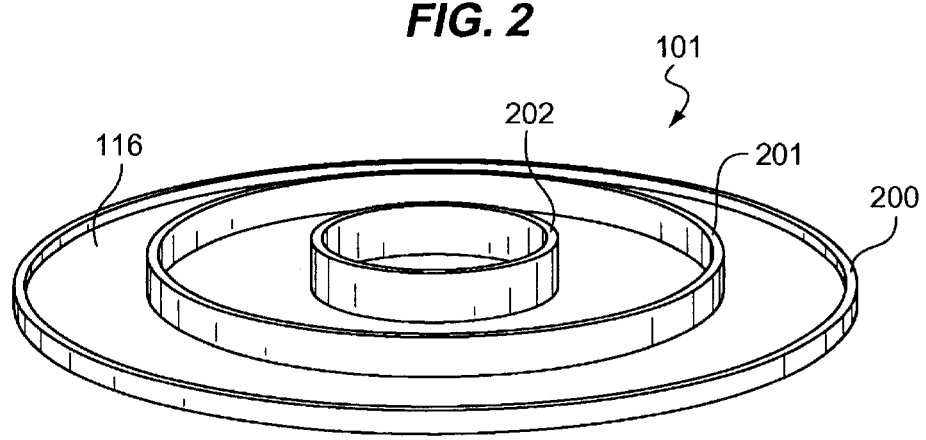
FIG. 2, illustrates a perspective view of a thermal plate of the present invention.

FIG. 2 illustrates an example of top thermal plate 101. Top thermal plate 101 includes concentric ridges 200, 201, and 202 circumscribing top surface 116 to catch and retain precipitation 117 on top thermal plate 101. The concentric ridges are designed to prevent precipitation 117 from sliding off of top thermal plate 101 before melting and/or evaporation occurs, making precipitation measuring system 100 highly sensitive to light precipitation events that are at or about 0.01 inches per hour of accumulation. Alternative configurations for top thermal plate 101, include without limitation, a single concentric ridge circumscribing the diameter of top surface 116 or a plurality of concentric ridges so as to form a ribbed top surface 116.

Bottom thermal plate 102 should be identical to top thermal plate 101 so that top and bottom thermal plates 101 and 102 cool in a linear relationship relative to each other. This facilitates precipitation measuring and wind speed calculation by eliminating additional calculations to compensate for non-linear cooling relationships caused by different geometrically shaped thermal plates. In alterative embodiments, top and bottom thermal plates 101 and 102 could comprise various shapes of different geometry as a matter of design choice, provided top thermal plate 101 and bottom thermal plate 102 are identical to facilitate the linear cooling relationship. In one preferred embodiment, top and bottom thermal plates 101 and 102 are circular in shape and are 6 inches in diameter. Top and bottom thermal plates 101 and 102 could be constructed from any conductive material, one example being aluminum.

Figure 3:
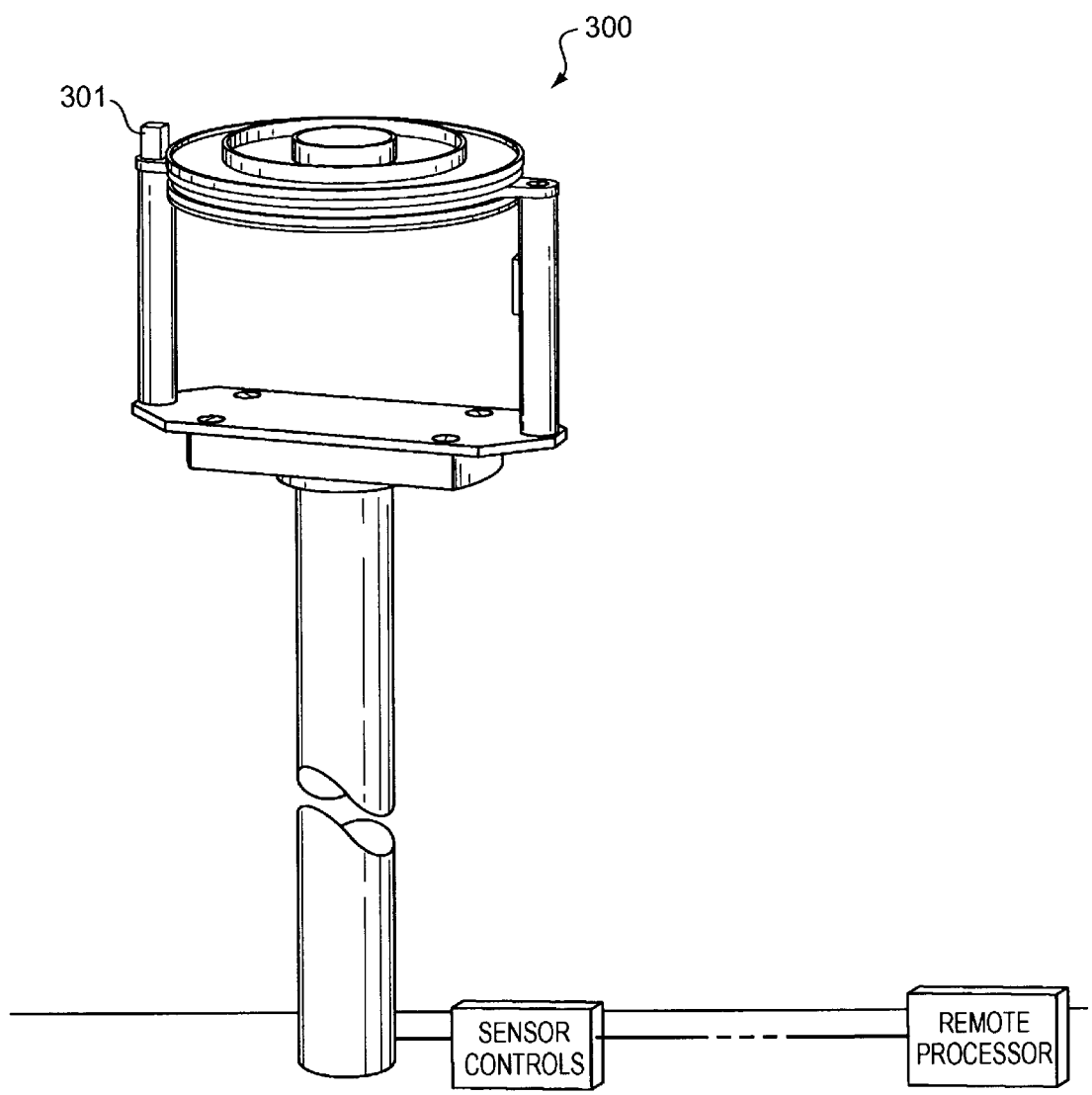
FIG. 3, illustrates an alternative embodiment of a precipitation measuring system of the present invention.

FIG. 3 illustrates another embodiment of a hot plate precipitation measuring system of the present invention, namely precipitation measuring system 300. Precipitation measuring system 300 is identical in all respects to precipitation measuring system 100 except that in precipitation measuring system 300 solar radiation sensors 114 and 118 is replaced by a precipitation on/off sensor 301. Precipitation on/off sensor 301 lowers the noise threshold in precipitation measuring system 300 by sensing the beginning of a precipitation event and starting precipitation measuring system 300. Precipitation on/off sensor 301 then senses the end of the precipitation event and turns precipitation measuring system 300 off. Precipitation on/off sensor 301 could turn precipitation measuring system 300 off immediately following the precipitation event or could turn precipitation measuring system 300 off at a predetermined time following the end of the precipitation event. Advantageously, turning precipitation measuring system 300 off at a predetermined time following the precipitation event helps ensure the precipitation event has ended. This prevents missing part of an intermittent precipitation event because of system warm up. Thus, precipitation measuring system 300 is only active during actual precipitation events, eliminating false readings due to solar radiation and/or wind. A preferred feature of this embodiment is that precipitation on/off sensor 301 reduces the power consumption of precipitation measuring system 300 by turning precipitation measuring system 300 on only during precipitation events, and turning precipitation measuring system 300 off at the termination of the precipitation event.

Figure 4:
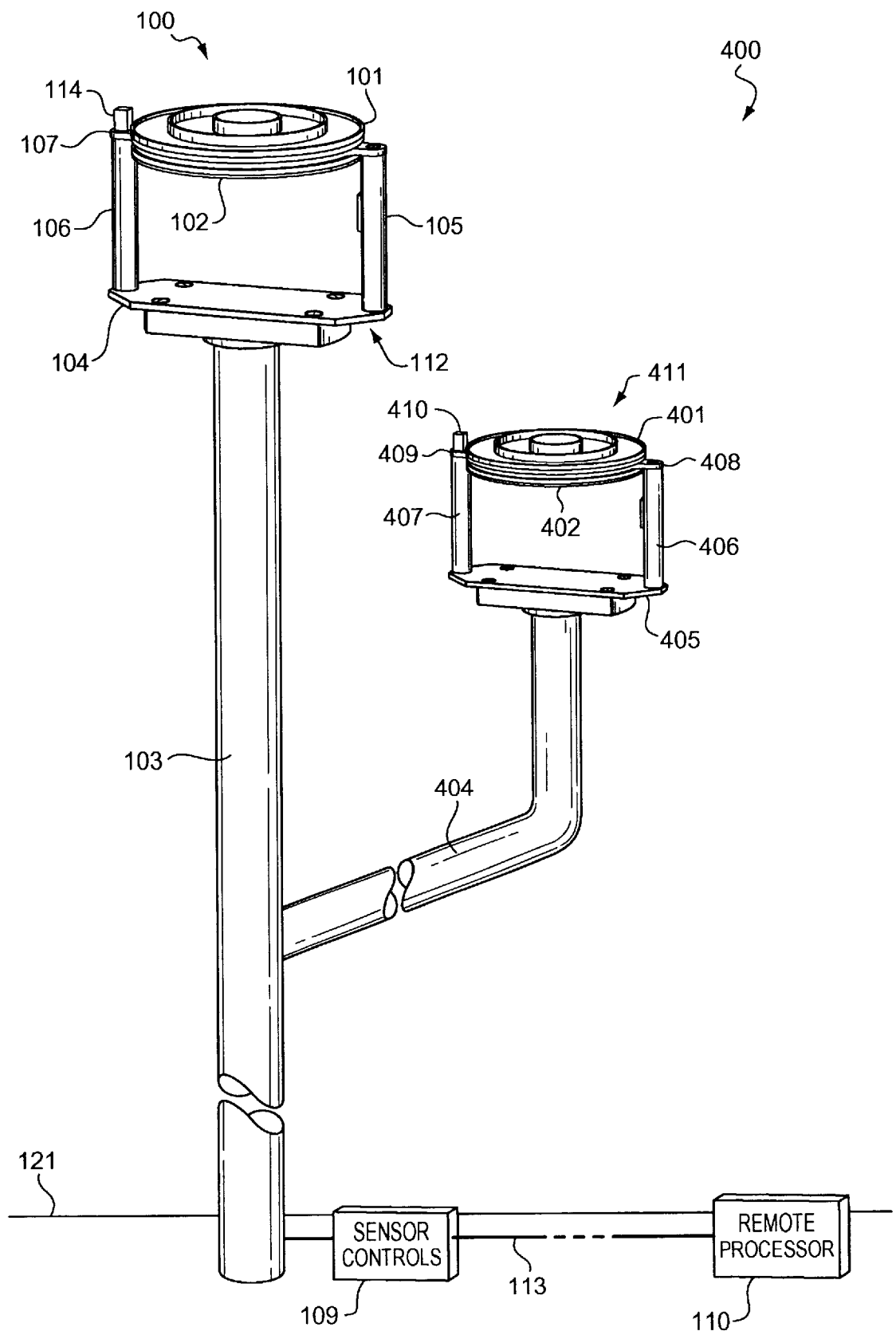
FIG. 4 illustrates an alternative embodiment of a precipitation measuring system of the present invention.

FIG. 4 illustrates another embodiment of a hot plate precipitation measuring system of the present invention, namely precipitation measuring system 400. Those skilled in the art will recognize numerous other configurations that are applicable to the invention described above. Those skilled in the art will also appreciate how combinations of features described below can be combined with the above-described embodiment.

Precipitation measuring system 400 includes precipitation measuring system 100 and a second precipitation measuring system 411 connected to post 103 by arm 404. Alternatively, precipitation measuring system 411 could be connected to post 103 by any suitable manner or be mounted on its own post e.g. 103 provided that it remains exposed to precipitation 117. Second precipitation measuring system 411 includes a second top thermal plate 401, a second bottom thermal plate 402, brackets 408 and 409, mounting posts 406 and 407, solar radiation sensor 410 and base plate 405. Thermal plates 401 and 402, base plate 405, mounting posts 406 and 407, solar radiation sensor 410, and brackets 408 and 409 are identical in all respects to thermal plates 101 and 102, base plate 104, mounting posts 105 and 106, solar radiation sensor 114, and brackets 107 and 108 respectively.

Precipitation measuring system 400 includes the same functional capabilities as precipitation measuring system 100, but includes the added capability of determining a blowing precipitation event from a natural precipitation event. An important aspect of this embodiment is the elevation difference between precipitation measuring systems 100 and 411. One of precipitation measuring systems 100 and 411 should be placed substantially higher than the other one of precipitation measuring systems 100 and 411 so that it is above precipitation that has already fallen but is being blown about by windy atmospheric conditions. This permits only natural falling precipitation to contact the higher one of precipitation measuring systems 100 and 411. The other one of precipitation measuring systems 100 and 411 should be placed at a lower elevation to permit both natural falling precipitation and precipitation that has already fallen but is being blown about by windy atmospheric conditions to contact the lower one of precipitation measuring systems 100 and 411. Using this configuration, differentiation between a blowing precipitation event and natural precipitation event can be made by a comparison of precipitation 117 measured at the individual precipitation measuring systems 100 and 411. If both precipitation measuring systems 100 and 411 measure substantially the same amount of precipitation, then it is known that the precipitation event is a natural precipitation event only. If no precipitation is detected on the higher one of precipitation measuring systems 100 and 411 then it is known that the precipitation event is a blowing precipitation event only. If precipitation is detected on both of precipitation measuring systems 100 and 411, but significantly more precipitation is measured on the lower one of precipitation measuring systems 100 and 411, then it is known that the precipitation event is a combined natural and blowing precipitation event.

Those skilled in the art will appreciate that numerous combinations of elevation differences for precipitation measuring systems 100 and 411 exist as a matter of design choice. Some examples of elevations include without limitation, placing precipitation measuring system 100 at an elevation of 100 feet relative to the earth's surface 121, and placing precipitation measuring system 411 at an elevation of 30 feet relative to the earth's surface 121. In another example, precipitation measuring system 100 could be located at an elevation of 50 feet relative to the earth's surface 121, while precipitation measuring system 411 could be located at an elevation of 5 feet relative to the earth's surface 121.

It should also be noted that precipitation measuring system 100 could be replaced by precipitation measuring system 300, which includes precipitation on/off sensor 301. In this case, precipitation measuring system 411 could include solar radiation sensors 114 and 118 or a precipitation on/off sensor e.g. 301. Solar radiation sensors 114 and 118 and precipitation on/off sensor e.g. 301 are not required, however, as precipitation on/off sensor 301 on precipitation measuring system 300 could be used to power down the entire precipitation measuring system 400.

In other embodiments, a plurality of precipitation measuring systems 411 could be connected to post 103 to improve measurement accuracy. Similarly, a plurality of precipitation measuring systems 400 could be employed at a plurality of locations and could include their own sensor controls and remote processors or be connected to sensor controls 109 and remote processor 110. Multiple precipitation measuring systems e.g. 411 or 400 improve the accuracy of measuring precipitation rates, detecting blowing and natural precipitation events, and calculating wind speed, as multiple sets of data is collected.

Figure 5:
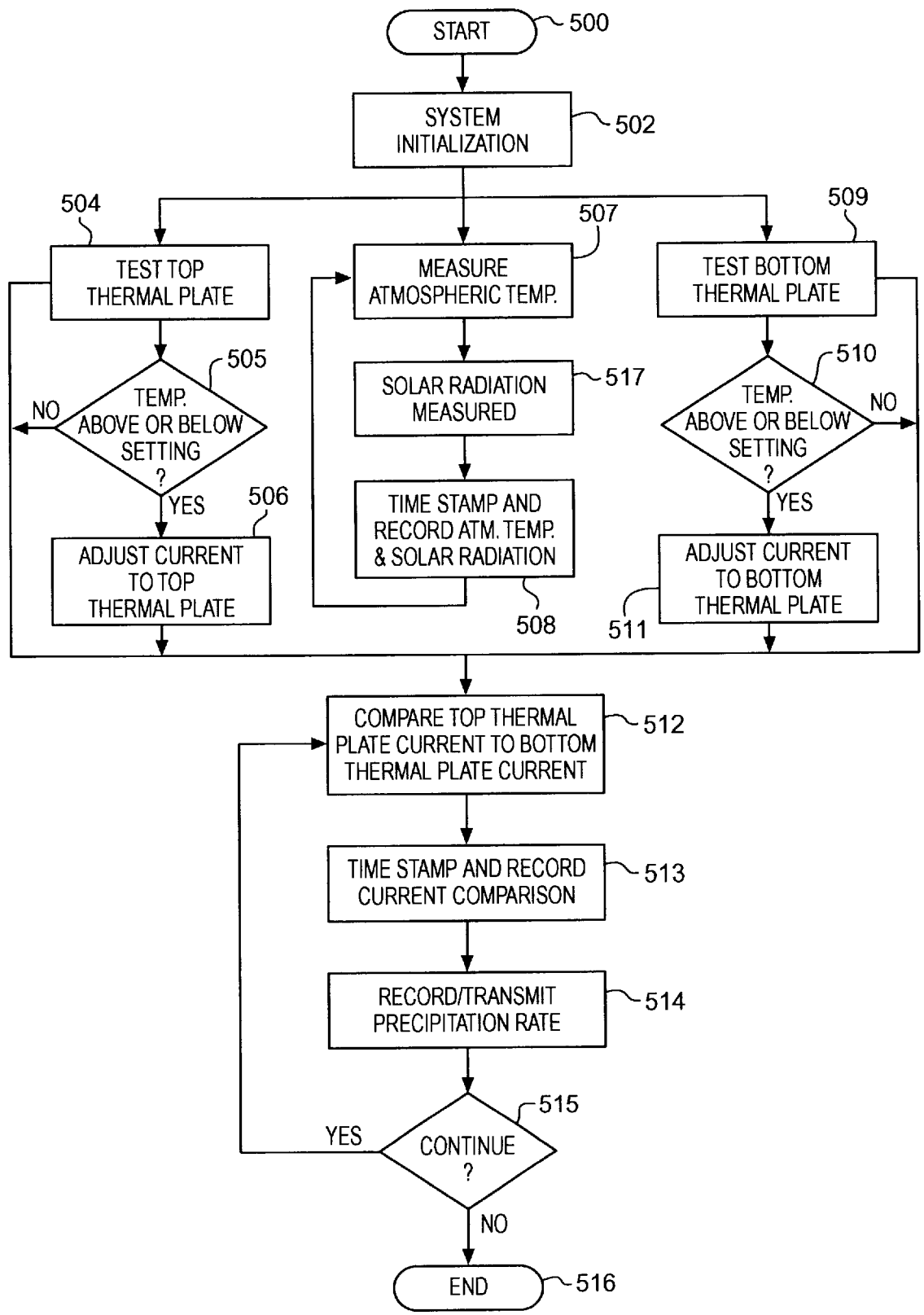
FIG. 5 illustrates the operational steps of a precipitation measuring system of the present invention in flow diagram form.

Operational Steps and Control—FIGS. 5–8:

FIG. 5 illustrates the operational steps of a precipitation measuring system in a flow diagram form. The system begins at step 500 and proceeds to system initialization at step 502. System initialization 502 includes, but is not limited to, heating top thermal plate 101 and bottom thermal plate 102 to a predetermined operating temperature, and calibrating top thermal plate 101 with bottom thermal plate 102. The optimal operating temperature for top thermal plate 101 is generally below the local boiling point of water, yet hot enough to evaporate precipitation 117 substantially instantaneously, where substantially instantaneously can be as much as 5–10 seconds. Alternatively, the operating temperature could be above the local boiling point of water in some cases, such as during heavy precipitation events. The operating temperature is programmable and adjustable depending on critical operating conditions that include without limitation, precipitation rate, ambient temperature, humidity, and precipitation size. For example, small precipitation sizes evaporate more quickly than large precipitation sizes falling at the same rate so that operating temperatures can be lower for small precipitation sizes.

When top thermal plate 101 and bottom thermal plate 102 are at an optimal operating temperature for present conditions, a continuous cycle begins for both thermal plates 101 and 102. The temperature of top thermal plate 101 is tested at step 504. If the temperature is above or below an ideal predetermined temperature setting at decision step 505 the current to top thermal plate 101 is adjusted accordingly at step 506 to maintain the ideal predetermined temperature and processing continues at step 512. If the temperature is at the ideal predetermined setting at decision step 505 then processing continues at step 512.

Substantially concurrently with the continuous process of steps 504, 505, and 506, the temperature of the bottom thermal plate 102 is tested at step 509. If the temperature is above or below the ideal predetermined temperature setting at decision step 510 the current to bottom thermal plate 102 is adjusted accordingly at step 511 to maintain the ideal predetermined temperature and processing continues at step 512. If the temperature is at the ideal predetermined setting at decision step 510 then processing continues at step 512.

Substantially concurrently with the continuous process of steps 504, 505, 506, 509, 510 and 511 the atmospheric temperature is measured at step 507 and the solar radiation contacting top thermal plate 101 and bottom thermal plate 102 is measured at step 517. The atmospheric temperature and solar radiation are recorded with a time stamp in sensor controls 109 at step 508. One skilled in the art will appreciate that the atmospheric temperature could be tested at step 507 and recorded at step 508 on a continuous basis or at predetermined time intervals during process steps 504, 505, 506, 509, 510 and 511 as a matter of design choice. One skilled in the art will also appreciate that the steps of controlling temperature by controlling current to the bottom thermal plate 102 and top thermal plate 101 could alternatively be by controlling voltage so that a constant power setting is achieved for bottom thermal plate 102 and and/or top thermal plate 101.

Substantially concurrently with the continuous thermal plate temperature testing process and atmospheric temperature testing process, the amount of current drawn by top thermal plate 101 and bottom thermal plate 102 are compared at step 512. As precipitation 117 strikes top thermal plate 101, precipitation 117 substantially instantaneously melts or evaporates thereby cooling top surface 116 of top thermal plate 101. Bottom thermal plate 102 is exposed to the same ambient environmental conditions as top thermal plate 101 except for contact with precipitation 117. Thus, in the absence of solar radiation, the difference in the power consumption of top thermal plate 101 versus the power consumption of bottom thermal plate 102 is directly proportional to the rate of precipitation 117 falling on top thermal plate 101. Further, since the individual melting or evaporating particles of precipitation 117 have a different power consumption curve depending on the type of precipitation 117, for example, snow, drizzle or rain, the different types of precipitation 117 can be distinguished by comparing the respective power consumption curves.

The power consumption for top thermal plate 101, bottom thermal plate 102, and the difference in power consumption are recorded and time stamped in sensor controls 109 at step 513. At step 514, remote processor 110 periodically polls the local processor in sensor controls 109 to retrieve the precipitation data, atmospheric temperature data and solar radiation data for further processing and recording along with the data from other precipitation measuring systems.

If the power consumption sensing and data recording are to continue at decision step 515, processing continues at step 512. If the power consumption sensing and data recording are not to continue at decision step 515, then processing ends at step 516.

Figure 6:
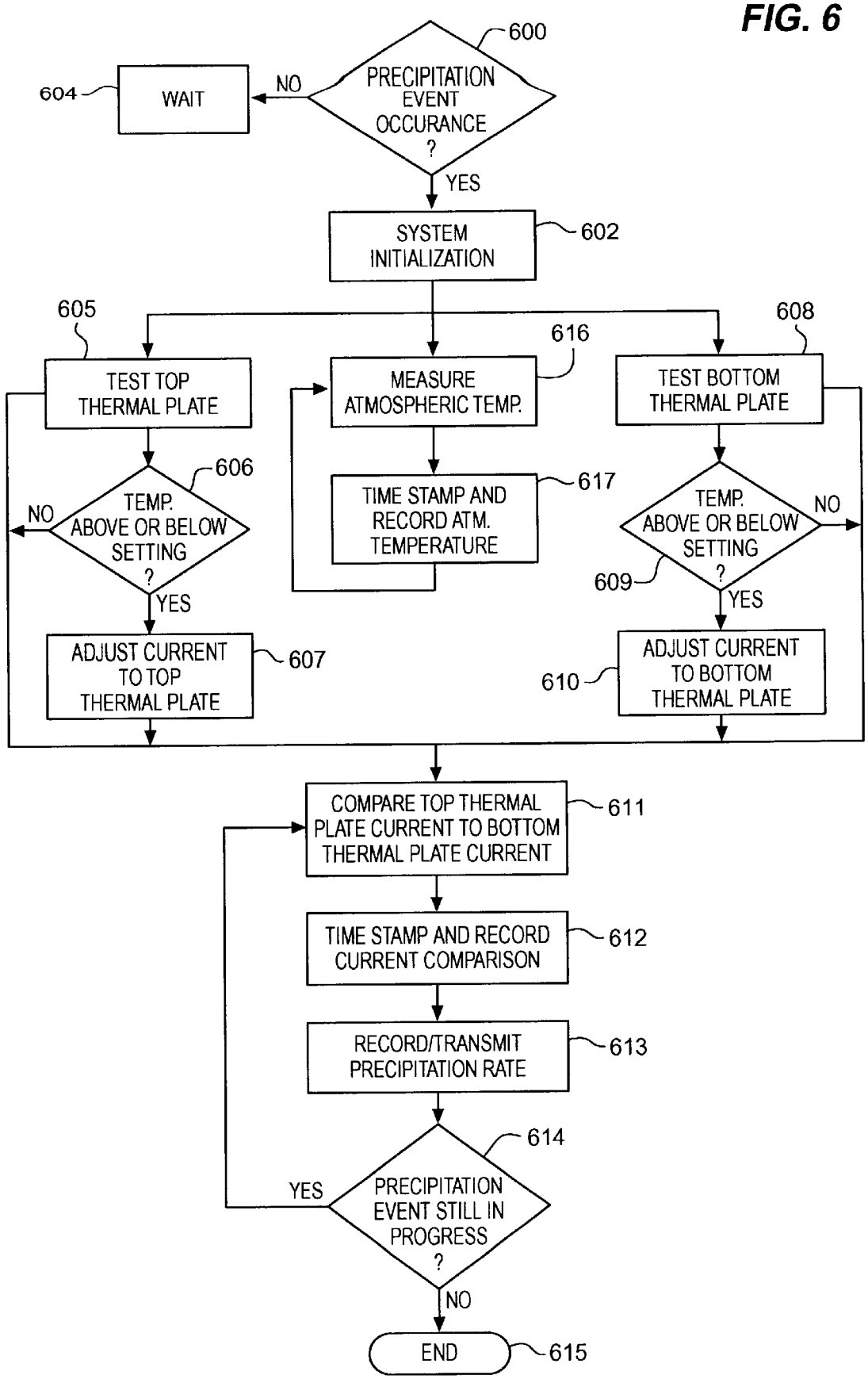
FIG. 6 illustrates alternative operational steps of a precipitation measuring system of the present invention in flow diagram form.

FIG. 6 illustrates alternative operation steps of a precipitation measuring system in a flow diagram form. The system begins at decision step 600 with precipitation on/off sensor 301 sensing for a precipitation event. If a precipitation event is not detected at step 600, precipitation on/off sensor waits at step 604 and continues sensing for an event step 600. If a precipitation event is detected at step 600, precipitation on/off sensor in cooperation with the processor in sensor controls 109 starts precipitation measuring system 100 and proceeds to system initialization at step 602. System initialization 602 includes, but is not limited to, heating top thermal plate 101 and bottom thermal plate 102 to a predetermined operating temperature, and calibrating top thermal plate 101 with bottom thermal plate 102.

When top thermal plate 101 and bottom thermal plate 102 are at an optimal operating temperature for present conditions, a continuous cycle begins for both thermal plates 101 and 102. The temperature of top thermal plate 101 is tested at step 605. If the temperature is above or below an ideal predetermined temperature setting at decision step 606 the current to top thermal plate 101 is adjusted accordingly at step 607 to maintain the ideal predetermined temperature and processing continues at step 611. If the temperature is at the ideal predetermined setting at decision step 606 then processing continues at step 611.

Substantially concurrently with the continuous process of steps 605, 606, and 607, the temperature of bottom thermal plate 102 is tested at step 608. If the temperature is above or below the ideal predetermined temperature setting at decision step 609 the current to bottom thermal plate 102 is adjusted accordingly at step 610 to maintain the ideal predetermined temperature and processing continues at step 611. If the temperature is at the ideal predetermined setting at decision step 609 then processing continues at step 611. Substantially concurrently with the continuous process of steps 605, 606, 607, 608, 609 and 610 the atmospheric temperature is measured at step 616 and recorded with a time stamp in sensor controls 109 at step 617.

Substantially concurrently with the continuous thermal plate temperature testing process and atmospheric temperature testing process, the amount of current drawn by top thermal plate 101 and bottom thermal plate 102 are compared at step 611. As precipitation 117 strikes top thermal plate 101, the power consumption of top thermal plate 101, bottom thermal plate 102, and the difference in power consumption is recorded with and time stamped in sensor controls 109 at step 612. At step 613, remote processor 110 periodically polls the local processor in sensor controls 109 to retrieve the precipitation data and atmospheric temperature data for further processing and recording along with the data from other precipitation measuring systems.

If the precipitation event is still in progress at step 614 processing continues at step 611. If the precipitation event has ended at step 614, on/off sensor 301 in cooperation with the microprocessor in sensor controls 109 shuts down the precipitation measuring system and processing ends at step 615. Advantageously, in this embodiment the noise from solar radiation is substantially eliminated because the precipitation measuring system is only activated during a precipitation event.

Figure 7:
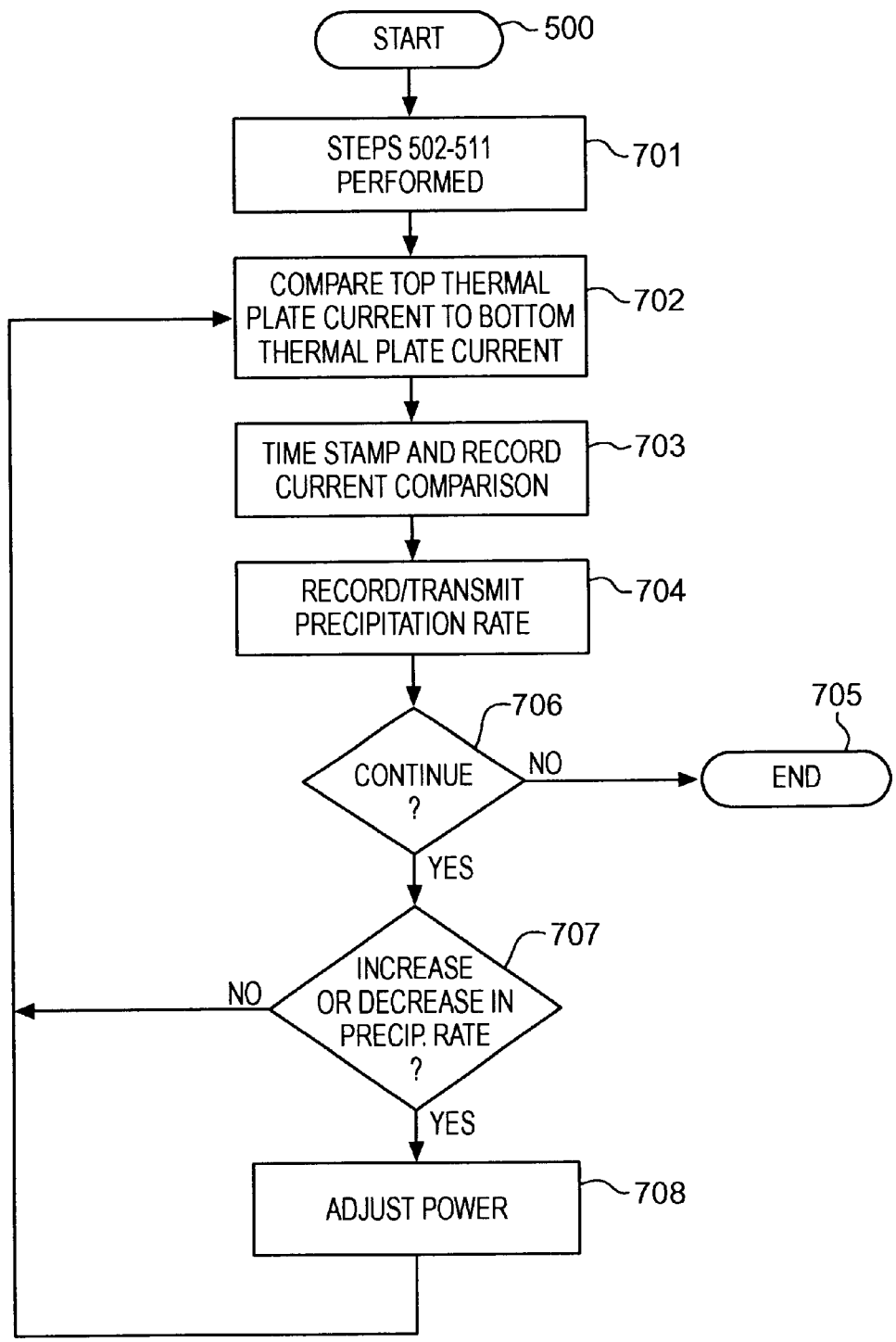
FIG. 7 illustrates alternative operational steps for a precipitation measuring systems of the present invention in a flow diagram form.

FIG. 7 illustrates alternative operational steps for the precipitation measuring systems of FIG. 5 in a flow diagram form. The system begins at step 500 and proceeds through steps 502–511 at step 701. Substantially concurrently with the continuous thermal plate temperature testing process and atmospheric temperature testing process, the amount of current drawn by top thermal plate 101 and bottom thermal plate 102 are compared at step 702. The power consumption for top thermal plate 101, bottom thermal plate 102, and the difference in power consumption are recorded with a time stamp in sensor controls 109 at step 703. At step 704, remote processor 110 periodically polls the local processor in sensor controls 109 to retrieve the precipitation data, atmospheric temperature data and solar radiation data for further processing and recording along with the data from other precipitation measuring systems. If the power consumption sensing and data recording are to continue at decision step 707, processing continues at decision step 707. If the precipitation rate has increased at decision step 707 then the substantially constant temperature of thermal plates 101 and 102 is increased to accommodate the increase in the precipitation rate at step 708. If the precipitation rate has decreased at decision step 707 then the substantially constant temperature of thermal plates 101 and 102 is decreased to accommodate the decrease in the precipitation rate at step 708. If the precipitation rate has not increased or decreased at decision step 707 then processing continues at step 702. If the power consumption sensing and data recording are not to continue at decision step 706, then processing ends at step 705.

A preferred feature of this embodiment is the real-time control of power to thermal plates 101 and 102. Advantageously the real-time control of power to thermal plates 101 and 102 permits increased accuracy in precipitation measuring by adjusting the substantially constant temperature to accommodate different precipitation rates. Also advantageously, the real-time control of power saves power by reducing power during lighter precipitation events.

Figure 8:
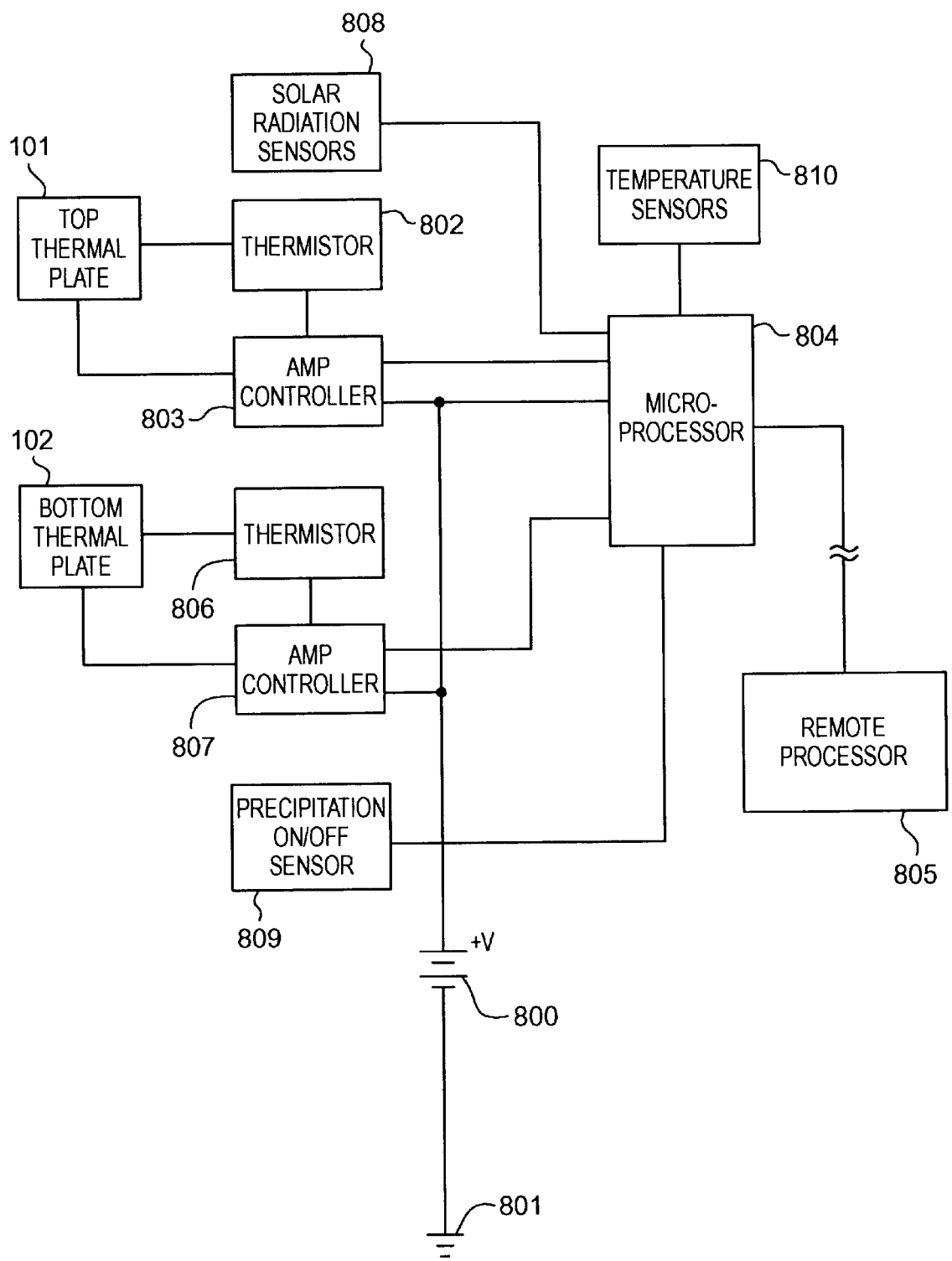
FIG. 8 illustrates control electronics for a precipitation measuring system of the present invention in block diagram form.

FIG. 8 illustrates control electronics for the precipitation measuring system in block diagram form. The precipitation measuring system is powered by 110 V AC or in the alternative by 12 V DC for remote operations. In either case the voltage source 800 with appropriate grounding 801, provides power for the entire system.

Top thermal plate 101 is connected in a loop with thermistor 802 to test temperature, and amp controller 803 to adjust the current to top thermal plate 101 as needed. Alternatively, temperature of top thermal plate 101 could be measured by sensing a measure of resistance of the heating element in top thermal plate. Microprocessor 804 compares and time stamps the data on current draw by top thermal plate 101 and transmits the data to a remote processor 805 for final precipitation rate calculations. Similarly, bottom thermal plate 102 is connected in a loop with thermistor 806 to test temperature, and amp controller 807 to adjust the current to bottom thermal plate 102 as needed. Microprocessor 804 compares and time stamps the data on current draw by bottom thermal plate 102, and transmits the data to remote processor 805 for final precipitation rate calculations. Temperature sensor 810 is connected to microprocessor 804. Microprocessor 804 monitors temperature sensor 810 and time stamps the data on atmospheric temperature and transmits the data to remote processor 805 for calculation of wind speed.

In embodiments that include solar radiation sensors, solar radiation sensors 808 are connected to microprocessor 804. Microprocessor 804 compares and time stamps the data on solar radiation, and transmits the data to remote processor 805 for adjustment of the precipitation data to account for solar radiation and final precipitation rate calculations.

In embodiments that include a precipitation on/off sensor, precipitation on/off sensor 809 is connected to microprocessor 804. Microprocessor 804 monitors precipitation on/off sensor 809 for the beginning of a precipitation event and starts the precipitation measuring system at the beginning of the precipitation event. Microprocessor 804 then monitors precipitation on/off sensor 809 for the end of a precipitation event and shuts down the precipitation measuring system at the end of the precipitation event.

Figure 9:
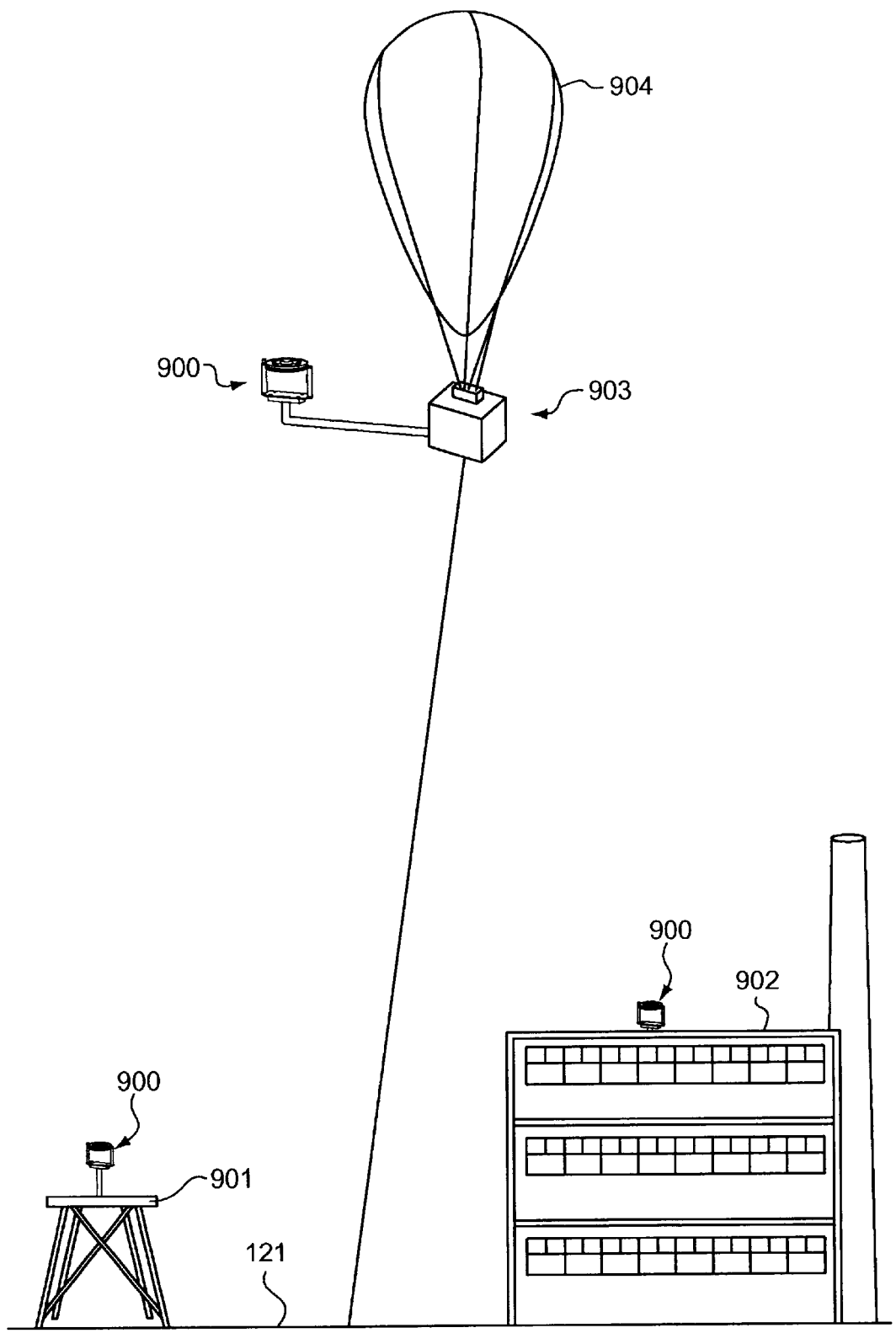
FIG. 9 illustrates various applications including ground based and air-borne applications of a precipitation measuring system of the present invention.

Applications—FIG. 9:

FIG. 9 depicts ground based and air-borne settings for a hot plate precipitation measuring system 900 of the present invention. During operation in ground-based settings, hot plate precipitation measuring system 900 may rest on stand 901, roof top 902 or directly on the earth's surface 121. Alternatively, hot plate precipitation measuring system 900 could be lifted to different altitudes in air-borne setting 903 by balloon 904 or other air-borne device. It should be noted that depending on atmospheric conditions at the time of measurement, steps may have to be taken to stabilize the balloon 904 or other air-borne device during measurement.

The above-described elements can be comprised of instructions that are stored on storage media. The instructions can be retrieved and executed by the processors. Some examples of instructions are software, program code, and firmware. Some examples of storage media are memory devices, tape, disks, integrated circuits, and servers. The instructions are operational when executed by the processors to direct the processors to operate in accord with the invention. The term "processor" refers to a single processing device or a group of inter-operational processing devices. Some examples of processors are integrated circuits and logic circuitry. Those skilled in the art are familiar with instructions, processors, and storage media.

Thus, it is apparent that there has been described, a hot plate precipitation measuring system for measuring precipitation rates, that fully satisfies the objects, aims, and advantages set forth above. While the present hot plate precipitation measuring system has been described in conjunction with specific embodiments thereof, it is evident that many alternatives, modifications, and variations can be devised by those skilled in the art in light of the foregoing description. Accordingly, this description is intended to embrace all such alternatives, modifications and variations as fall within the spirit and scope of the appended claims.

What is claimed is:

1. A precipitation measuring system comprising:
   a plurality of sensors that each include a first plate exposed to precipitation and a second plate not exposed to the precipitation and that are each configured to maintain the first plate and the second plate at a substantially constant temperature and transfer data that indicates a difference in power consumption between the first plate and the second plate; and
   a remote processor configured to receive and process the data that indicates the difference in power consumption to determine precipitation rates at each of the sensors.

2. The precipitation measuring system of claim 1 wherein the data that indicates the difference in power consumption comprises data that indicates power consumption for the first plate and power consumption for the second plate.

3. The precipitation measuring system of claim 1 wherein the data that indicates the difference in power consumption comprises data that indicates current draw for the first plate and current draw for the second plate.

4. The precipitation measuring system of claim 1 wherein the sensors are each configured to time stamp the data.

5. The precipitation measuring system of claim 1 wherein the sensors are each configured to determine atmospheric temperatures and wherein the data indicates the atmospheric temperatures.

6. The precipitation measuring system of claim 5 wherein the remote processor is configured to receive and process the data to determine wind speed for at least one of the sensors.

7. The precipitation measuring system of claim 1 wherein the sensors are each configured to determine radiation levels and wherein the data indicates the radiation levels.

8. The precipitation measuring system of claim 7 wherein the remote processor is configured to adjust the data indicating the difference in power consumption responsive to the radiation levels.

9. The precipitation measuring system of claim 1 wherein the remote processor is configured to determine an adjustment to the substantially constant temperature for one of the sensors responsive to the precipitation rate at the one sensor.

10. The precipitation measuring system of claim 1 further comprising communication links configured to transport the data between the sensors and the remote processor.

11. A method of operating a precipitation measuring system that includes a plurality of sensors that each include a first plate exposed to precipitation and a second plate not exposed to the precipitation, the method comprising:
    in the sensors, maintaining the first plate and the second plate at a substantially constant temperature;
    transferring data from the sensors to a remote processor wherein the data indicates a difference in power consumption between the first plate and the second plate; and
    in the remote processor, processing the data that indicates the difference in power consumption to determine precipitation rates at each of the sensors.

12. The method of claim 11 wherein the data that indicates the difference in power consumption comprises data that indicates power consumption for the first plate and power consumption for the second plate.

13. The method of claim 11 wherein the data that indicates the difference in power consumption comprises data that indicates current draw for the first plate and current draw for the second plate.

14. The method of claim 11 further comprising time stamping the data.

15. The method of claim 11 further comprising, in the sensors, determining atmospheric temperatures and wherein the data indicates the atmospheric temperatures.

16. The method of claim 15 further comprising, in the remote processor, processing the data to determine wind speed for at least one of the sensors.

17. The method of claim 11 further comprising, in the sensors, determining radiation levels and wherein the data indicates the radiation levels.

18. The method of claim 17 further comprising, in the remote processor, adjusting the data indicating the difference in power consumption responsive to the radiation levels.

19. The method of claim 11 further comprising, in the remote processor, determining an adjustment to the substantially constant temperature for one of the sensors responsive to the precipitation rate at the one sensor.

20. The method of claim 11 wherein transferring the data from the sensors to the remote processor comprises transferring the data over communication links.

21. A product for a precipitation measuring system comprising a remote processor and a plurality of sensors that each include a first plate exposed to precipitation and a second plate not exposed to the precipitation and that are each configured to maintain the first plate and the second plate at a substantially constant temperature and transfer data to the remote processor that indicates a difference in power consumption between the first plate and the second plate, the product comprising:

processing instructions configured to direct the remote processor to process the data that indicates the difference in power consumption to determine precipitation rates at each of the sensors; and a storage medium configured to store the processing instructions.

22. The product of claim 21 wherein the data that indicates the difference in power consumption comprises data that indicates power consumption for the first plate and power consumption for the second plate.

23. The product of claim 21 wherein the data that indicates the difference in power consumption comprises data that indicates current draw for the first plate and current draw for the second plate.

24. The product of claim 21 wherein the sensors are each configured to determine atmospheric temperatures, wherein the data indicates the atmospheric temperatures, and wherein the processing instructions are configured to direct the remote processor to process the data to determine wind speed for at least one of the sensors.

25. The product of claim 21 wherein the sensors are each configured to determine radiation levels, wherein the data indicates the radiation levels, and wherein the processing instructions are configured to direct the remote processor to adjust the data indicating the difference in power consumption responsive to the radiation levels.

26. The product of claim 21 wherein the processing instructions are configured to direct the remote processor to determine an adjustment to the substantially constant temperature for one of the sensors responsive to the precipitation rate at the one sensor.

* * * * *

UNITED STATES PATENT AND TRADEMARK OFFICE
CERTIFICATE OF CORRECTION

PATENT NO. : 6,675,100 B1
DATED : January 6, 2004
INVENTOR(S) : John Hallett and Roy Martin Rasmussen It is certified that error appears in the above-identified patent and that said Letters Patent is hereby corrected as shown below:

<u>Title page,</u>
Item [73], should read -- University Corporation for Atmospheric Research, Boulder, CO (US); The Board of Regents of the University and Community College System of Nevada, on behalf of Desert Research Institute, Reno, NV (US) --

Signed and Sealed this

Eleventh Day of May, 2004

JON W. DUDAS
*Acting Director of the United States Patent and Trademark Office*